(12) United States Patent
Han et al.

(10) Patent No.: US 8,000,908 B2
(45) Date of Patent: Aug. 16, 2011

(54) METHODS AND SYSTEMS FOR DEVELOPING MESH NETWORKS AND ESTIMATING AIR FLOW AROUND VEHICLE BODY SURFACES

(75) Inventors: Taeyoung Han, Bloomfield Hills, MI (US); Zhaoji G. Yang, Canton, MI (US); Kuo-Huey Chen, Troy, MI (US); Margaret U. Harder, Novi, MI (US); Shailesh S. Jindal, Sterling Heights, MI (US); James P. Johnson, Detroit, MI (US); Radhika Cherukuru, Sterling Heights, MI (US); Lingaiah N. Mendu, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 464 days.

(21) Appl. No.: 12/172,877

(22) Filed: Jul. 14, 2008

(65) Prior Publication Data

US 2010/0010753 A1     Jan. 14, 2010

(51) Int. Cl.
*G01F 1/00* (2006.01)
(52) U.S. Cl. .......................................................... 702/45
(58) Field of Classification Search ...................... 702/45
See application file for complete search history.

(56) References Cited

OTHER PUBLICATIONS

Dr. Edward Lanzilotta, Integrating Aerodynamic Adams and PowerFLOW C simuation, Apr. 17, 2008, p. 1-6.*

* cited by examiner

*Primary Examiner* — Tung S Lau
(74) *Attorney, Agent, or Firm* — Ingrassia Fisher & Lorenz, P.C.

(57) ABSTRACT

A method for developing a mesh network for analyzing air flow around a surface of a vehicle body includes the steps of determining a plurality of estimates for a flow direction for the air flow for a plurality of locations around the surface and generating the mesh network based at least in part on the plurality of estimates. The mesh network comprises a plurality of mesh lines. Each mesh line is at least substantially aligned with the flow direction proximate a corresponding one of the plurality of locations.

14 Claims, 6 Drawing Sheets

METHODS AND SYSTEMS FOR DEVELOPING MESH NETWORKS AND ESTIMATING AIR FLOW AROUND VEHICLE BODY SURFACES

TECHNICAL FIELD

The present invention generally relates to the field of vehicles and, more specifically, to methods and systems for estimating air flow around vehicle body surfaces and developing mesh networks for use in estimating air flow around vehicle body surfaces.

BACKGROUND OF THE INVENTION

Today, air flow around vehicles is often estimated using mesh networks. Typically, such mesh networks include numerous mesh points around the surface of the vehicle body. Various measures pertaining to air flow and related forces, such as lift force and drag force, can then be measured along the numerous points and then aggregated to ascertain overall estimates for these values for the vehicle body surface.

While use of such mesh networks can be valuable in estimating such various flow values, a large number of mesh points is generally needed to obtain accurate results. For example, a typical mesh network used for estimating air flow along vehicle body surfaces may include twenty to forty million or more mesh points. Accordingly, the generation and use of typical mesh networks having such a large number of mesh points can be expensive and time consuming. Additionally, typical mesh networks may also provide results that are less than optimal in terms of their numerical accuracy and stability.

Accordingly, it is desired to provide an improved method for generating mesh networks for estimating air flow around vehicle body surfaces, for example with potentially fewer mesh points and/or that produces results with potentially increased numerical accuracy and/or stability. It is also desired to provide an improved program product for estimating air flow around vehicle body surfaces, for example with potentially fewer mesh points and/or that produces results with potentially increased numerical accuracy and/or stability. It is further desired to provide an improved system for estimating air flow around vehicle body surfaces, for example with potentially fewer mesh points and/or that produces results with potentially increased numerical accuracy and/or stability.

Furthermore, other desirable features and characteristics of the present invention will be apparent from the subsequent detailed description and the appended claims, taken in conjunction with the accompanying drawings and the foregoing technical field and background.

SUMMARY OF THE INVENTION

In accordance with an exemplary embodiment of the present invention, a method for developing a mesh network for analyzing air flow around a surface of a vehicle is provided. The method comprises the steps of determining a plurality of estimates for a flow direction for the air flow for a plurality of locations around the surface and generating the mesh network based at least in part on the plurality of estimates. The mesh network comprises a plurality of mesh lines. Each mesh line is at least substantially aligned with the flow direction proximate a corresponding one of the plurality of locations.

In accordance with another exemplary embodiment of the present invention, a program product for developing a mesh network for analyzing air flow around a surface of a vehicle is provided. The program product comprises a program and a computer-readable signal-bearing media. The program is configured to at least facilitate determining a plurality of estimates for a flow direction for the air flow for a plurality of locations around the surface and generating the mesh network based at least in part on the plurality of estimates. The mesh network comprises a plurality of mesh lines. Each mesh line is at least substantially aligned with the flow direction proximate a corresponding one of the plurality of locations. The computer-readable signal-bearing media bears the program.

In accordance with a further exemplary embodiment of the present invention, a system for developing a mesh network for analyzing air flow around a surface of a vehicle is provided. The system comprises a sensor and a processor. The sensor is configured to at least facilitate determining a plurality of estimates for a flow direction for the air flow for a plurality of locations around the surface. The processor is coupled to the sensor, and is configured to at least facilitate generating the mesh network based at least in part on the plurality of estimates. The mesh network comprises a plurality of mesh lines. Each mesh line is at least substantially aligned with the flow direction proximate a corresponding one of the plurality of locations.

BRIEF DESCRIPTION OF THE DRAWINGS

The present invention will hereinafter be described in conjunction with the following drawing figures, wherein like numerals denote like elements, and wherein.

DETAILED DESCRIPTION OF THE INVENTION

The following detailed description is merely exemplary in nature, and is not intended to limit the invention or the application and uses of the invention. Furthermore, there is no intention to be bound by any expressed or implied theory presented in the preceding technical field, background, brief summary or the following detailed description.

Embodiments of the invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with any number of different inverters for any number of different types of vehicles.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

Figure 1:
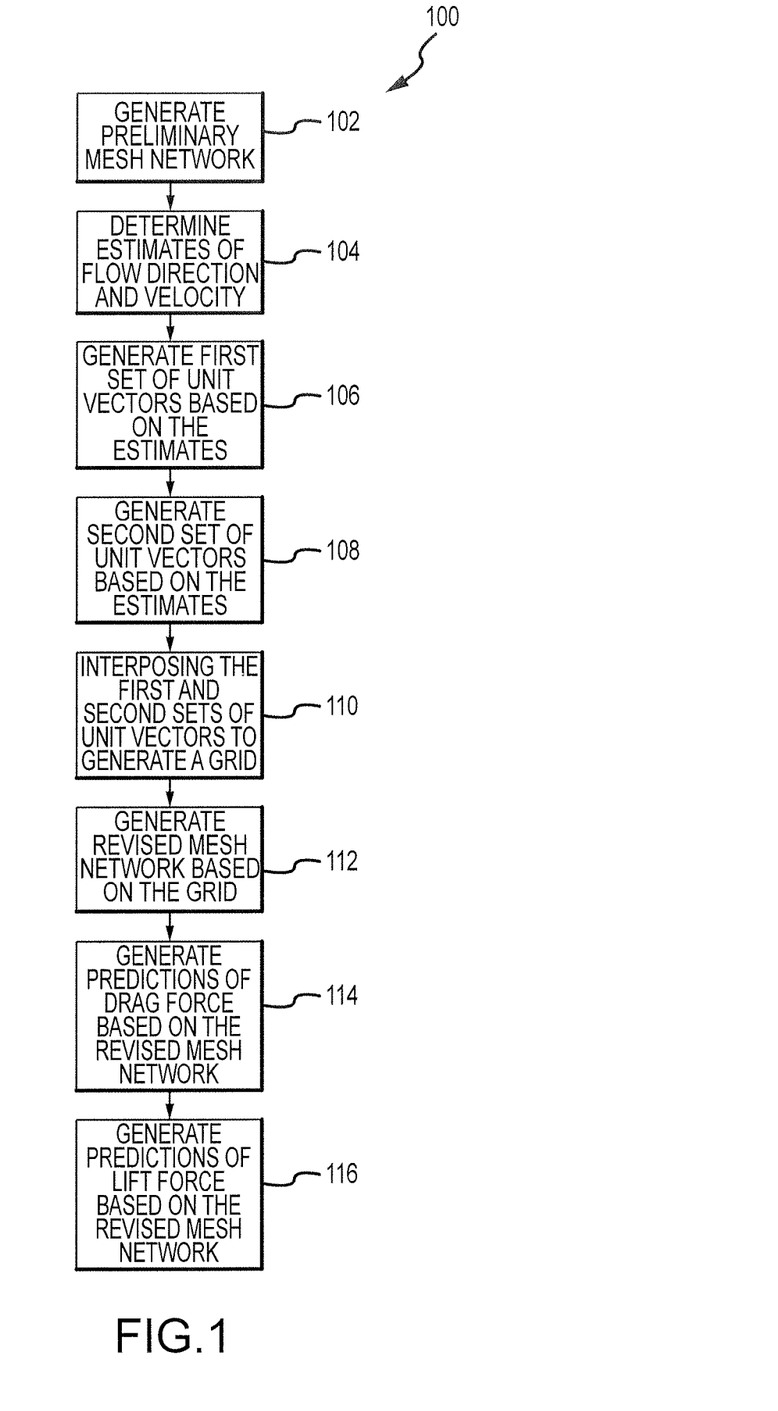
FIG. 1 is a flowchart of a process for generating a mesh network and estimating air flow around a vehicle body surface, in accordance with an exemplary embodiment of the present invention.

FIG. 1 is a flowchart of a process 100 for generating a mesh network and estimating air flow around a vehicle body surface, in accordance with an exemplary embodiment of the present invention. In a preferred embodiment, the process 100 can be implemented in connection with a system and/or program product such as the system 200 depicted in FIG. 2 and/or a program product that includes the program 212 depicted in FIG. 2, as will be described further below in connection with FIG. 2.

As depicted in FIG. 1, the process 100 begins with the step of generating a preliminary mesh network around the vehicle body surface (step 102). The preliminary mesh network can be generated using any number of different techniques. The preliminary mesh network will be used in generating a more refined mesh network through various of the remaining steps of the process 100 as described below. In a preferred embodiment, the preliminary mesh network is generated by a processor, such as the processor 206 of the computer system 204 of FIG. 2.

The preliminary mesh network is then utilized in determining estimates of flow direction and velocity at various points around the vehicle body surface (step 104). In a preferred embodiment, the estimates of flow direction and velocity are determined by one or more sensors, such as the sensors 202 depicted in FIG. 2, using the preliminary mesh network generated in step 102. Also in a preferred embodiment, the estimates of flow direction and velocity are obtained for each of the various points along the preliminary mesh network, representing various corresponding points along the vehicle body surface.

Figure 2:
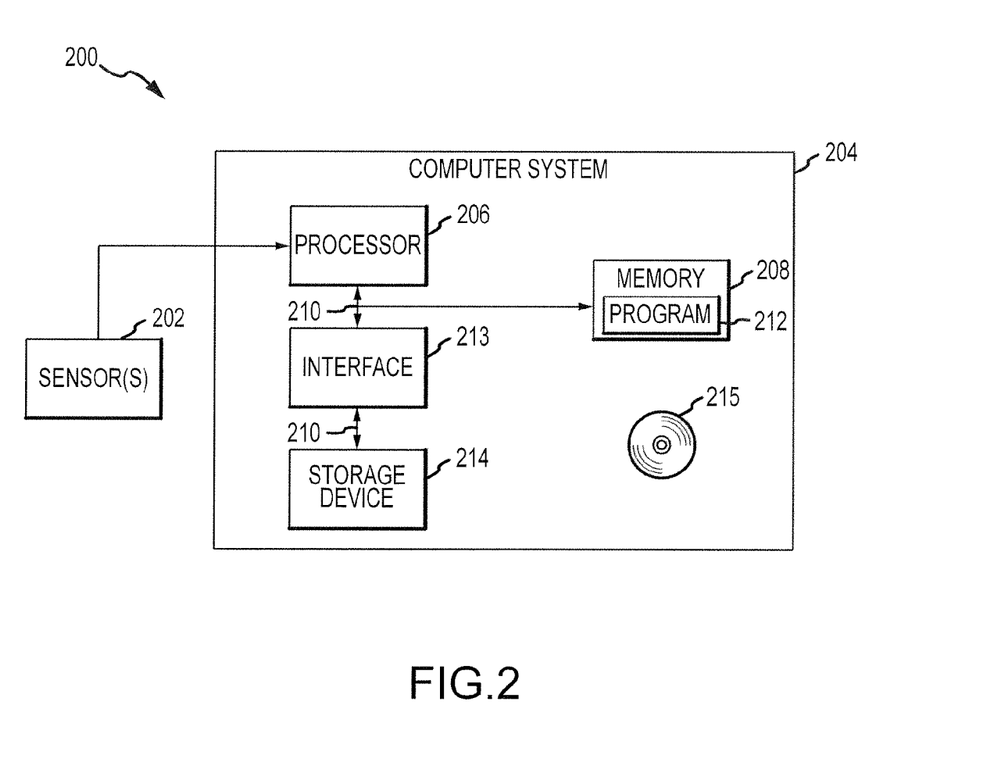
FIG. 2 is a functional block diagram of a system for generating a mesh network and estimating air flow around a vehicle body surface, and that can be implemented in connection with the process of FIG. 1, in accordance with an exemplary embodiment of the present invention.
Figure 3:
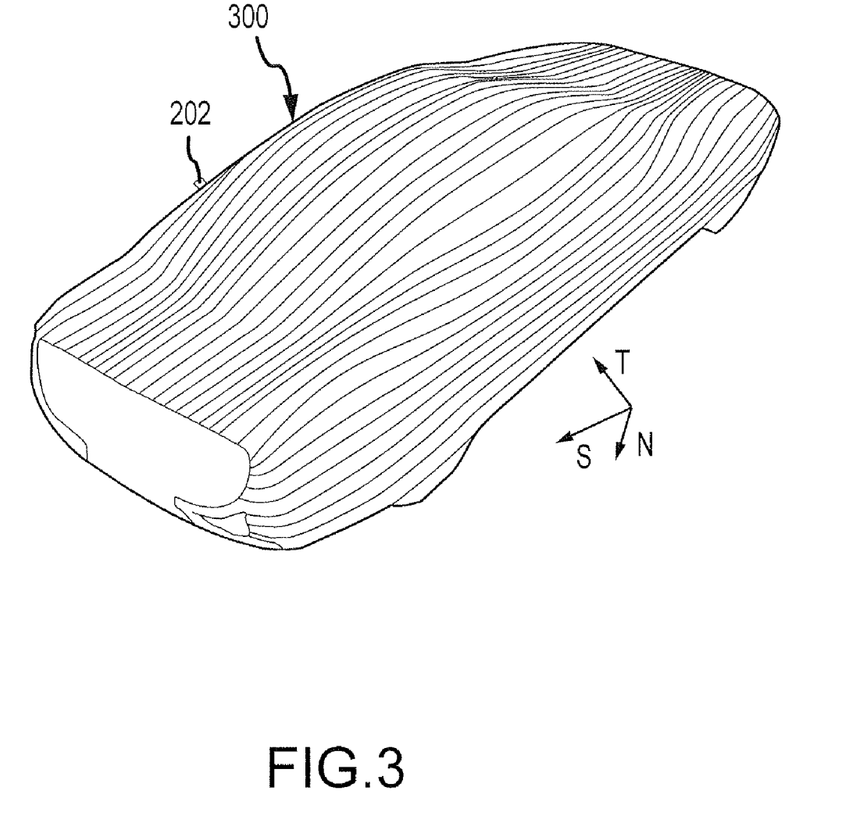
FIG. 3 is a schematic image of a vehicle body surface showing estimated air flow patterns around the vehicle body surface, and that can be implemented in connection with the process of FIG. 1 and the system of FIG. 2 in generating a mesh network, in accordance with an exemplary embodiment of the present invention.

Turning now to FIG. 3, a schematic image of a vehicle body surface is provided, in accordance with an exemplary embodiment of the present invention. The schematic image shows numerous different air flow patterns 300 around the vehicle body surface. In a preferred embodiment, the air flow patterns 300 represent the estimates of the flow direction and velocity of the air around the surface of the vehicle body as determined in step 104 of FIG. 1 as described above. Also in a preferred embodiment, the air flow patterns 300, and the measures of flow direction and velocity represented therein, are estimated by one or more sensors, such as the sensors 202 of FIG. 2 and described further below. As depicted in FIG. 3, the sensors 202 are preferably disposed in proximity to the surface of vehicle body. The air flow patterns 300 and the measures of flow direction and velocity represented therein can be used to generate various unit vectors that can then be utilized in generating an improved mesh network, as will now be described below.

Returning back to FIG. 1, a first set of unit vectors are generated based upon the estimates of flow direction and velocity (step 106). Each of the first set of unit vectors is generated to be a unit vector in a streamline direction of air flow at a particular point on the preliminary mesh network, representing a particular point on the surface of the vehicle body. Specifically, each of the first set of unit vectors is at least substantially parallel to the flow direction proximate a respective one of a plurality of locations around the surface of the vehicle body. Accordingly, each of the first unit vectors represents a direction of flow for a particular point on the vehicle body surface, as determined by the estimates of flow direction and velocity using the preliminary mesh network.

In a preferred embodiment, the first set of unit vectors are generated using the following equation:

$$\vec{S} = \frac{\vec{V}_{EXT}}{|\vec{V}_{EXT}|}, \quad \text{(Equation 1)}$$

where $V_{EXT}$ represents an exterior velocity of the air flow at a particular location along the vehicle body surface, as determined from the estimated air flow direction and velocity of step 104, preferably using the air flow patterns 300 of FIG. 3. In Equation 1, $\vec{s}$ represents a unit vector in a streamline direction, s, that is parallel to the direction of the air flow and tangential to the surface of the vehicle body at a particular point along the vehicle body surface. Also in a preferred embodiment, the first set of unit vectors are generated by the processor, such as the processor 206 of the computer system 204 of FIG. 2.

Figure 4:
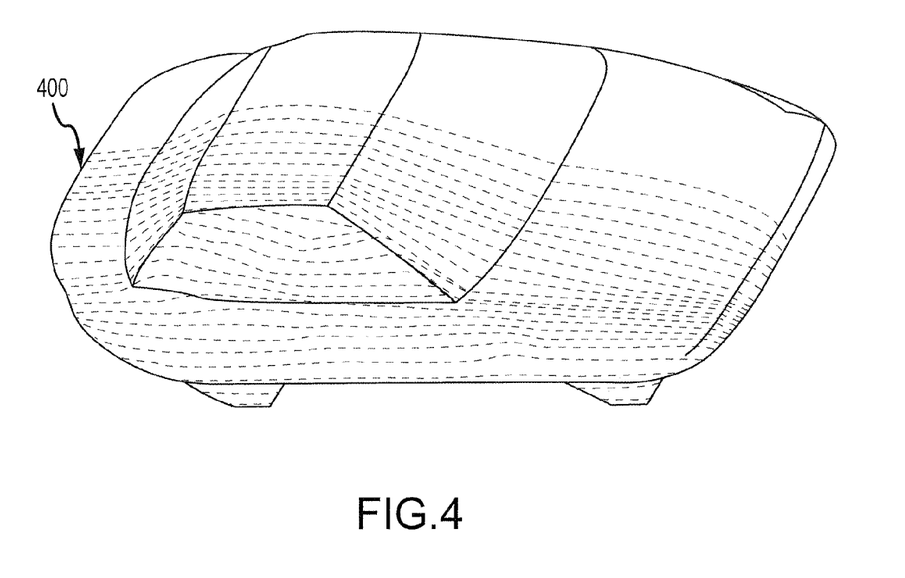
FIG. 4 is a schematic image of a vehicle body surface showing a first set of unit vectors that are parallel to the direction of the air flow patterns of FIG. 3, and that can be implemented in connection with the process of FIG. 1 and the system of FIG. 2 in generating a mesh network, in accordance with an exemplary embodiment of the present invention.

FIG. 4 is a schematic image of a vehicle body surface showing a first set of unit vectors 400 such as those generated in step 106 of the process 100 of FIG. 1. As shown in FIG. 4, the first set of unit vectors 400 are parallel to the direction of the air flow patterns 300 of FIG. 3. That is, each of the first set of unit vectors 400 is parallel to a flow direction of a corresponding air flow pattern 300 at a particular point along the surface of the vehicle body to which the particular first unit vector 400 corresponds.

A second set of unit vectors are also generated based upon the estimates of flow direction and velocity (step 108). Each of the second set of unit vectors is generated to be a unit vector that is orthogonal to a corresponding one of the first set of unit vectors. Specifically, each of the second set of unit vectors is at least substantially orthogonal to the flow direction and to a surface of the vehicle body proximate a respective one of a plurality of locations around the surface of the vehicle body, as well as to a corresponding one of the first set of unit vectors corresponding to that location.

In a preferred embodiment, the second set of unit vectors are generated using the following equation:

$$\vec{t} = \vec{s} \times \vec{n}$$ (Equation 2), where $\vec{s}$ represents a first unit vector corresponding to a particular point along the vehicle body surface, $\vec{n}$ represents a unit vector normal to the surface at the same particular point along the vehicle body surface corresponding to the this $\vec{s}$ unit vector, and $\vec{t}$ represents a second unit vector corresponding to the $\vec{s}$ unit vector at the same particular point along the vehicle body surface and which is also tangent to the surface. Accordingly, the corresponding vectors $\vec{t}$, $\vec{s}$, and $\vec{n}$ for a particular point along the vehicle body surface are each orthogonal to one another. Also in a preferred embodiment, the second set of unit vectors are generated by the processor, such as the processor 206 of the computer system 204 of FIG. 2.

Figure 5:
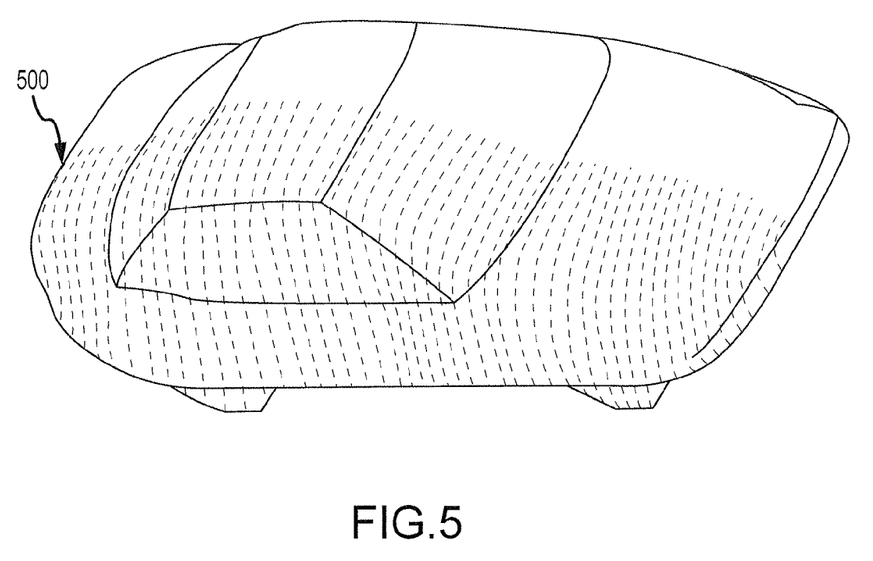
FIG. 5 is a schematic image of a vehicle body surface showing a second set of unit vectors that are normal to the first set of unit vectors of FIG. 4, and are also tangent to the surface that can be implemented in connection with the process of FIG. 1 and the system of FIG. 2 in generating a mesh network, in accordance with an exemplary embodiment of the present invention.

FIG. 5 is a schematic image of a vehicle body surface showing a second set of unit vectors 500 such as those generated in step 108 of the process 100 of FIG. 1. As shown in FIG. 5, the second set of unit vectors 500 are orthogonal to the direction of the first set of unit vectors 400 of FIG. 4. That is, each of the second set of unit vectors 500 corresponding to a particular point along the surface of the vehicle body is orthogonal to a corresponding one of the first set of unit vectors 400 for that particular point along the surface of the vehicle body.

Returning to FIG. 1, it will be appreciated that while the generation of the first, or $\vec{s}$, unit vectors is depicted in FIG. 1 and described above before the generation of the second, or $\vec{t}$, unit vectors, this may vary in other embodiments. For example, in certain embodiments, some or all of the second, or $\vec{t}$, unit vectors may be generated before some or all of the first, or $\vec{s}$, unit vectors. In addition, in certain embodiments, some or all of the second, or $\vec{t}$, unit vectors may be generated simultaneously with some or all of the first, or $\vec{s}$, unit vectors. It will similarly be appreciated that certain other steps of the process 100 may be performed simultaneously or in either order, regardless of the order depicted in FIG. 1 and/or described herein.

The first and second unit vectors are then interposed together to generate a grid (step 110). The grid represents an overlapping of the first and second unit vectors. This overlapping of the first and second unit vectors yields a plurality of lines and points, each representing an intersection of one of the first unit vectors and a corresponding one of the second unit vectors at a particular point. In a preferred embodiment, the first and second unit vectors are interposed together using a processor, such as the processor 206 of the computer system 204 of FIG. 2.

Figure 6:
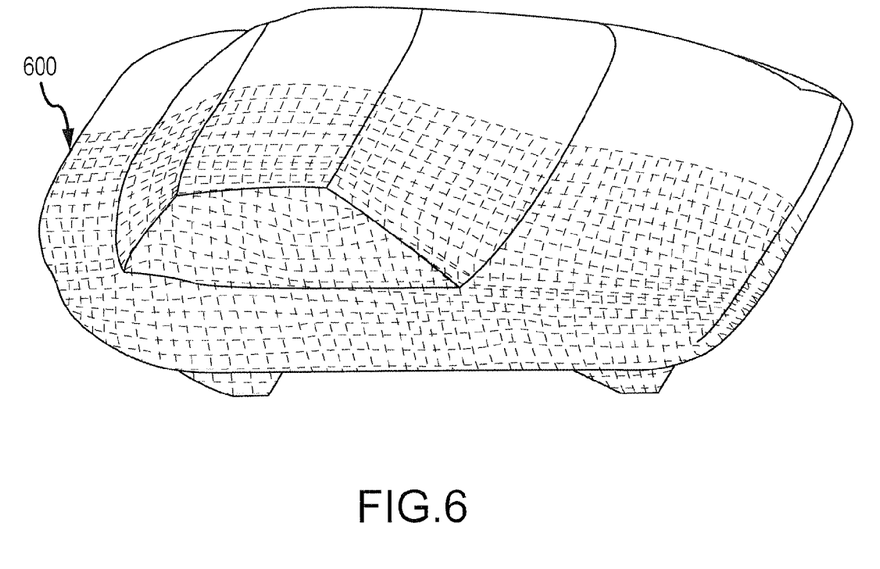
FIG. 6 is a schematic image of a vehicle body surface showing an interposition of the first and second unit vectors of FIGS. 4 and 5, respectively, and that can be implemented in connection with the process of FIG. 1 and the system of FIG. 2 as a mesh network, in accordance with an exemplary embodiment of the present invention.

FIG. 6 is a schematic image of a vehicle body surface showing such an interposition of the first and second unit vectors, in accordance with an exemplary embodiment of the present invention. Specifically, FIG. 6 depicts a grid 600 representing the interposition of each of the first unit vectors 400 of FIG. 4 with corresponding second unit vectors 500 of FIG. 5, thereby generating the grid 600 of FIG. 6. Each point on the grid 600 of FIG. 6 thus represents the intersection of a first unit vector 400 of FIG. 4 with a corresponding second unit vector 500 of FIG. 5.

Returning again to FIG. 1, a revised mesh network is then generated from the grid (step 112). In a preferred embodiment, the revised mesh network is generated in step 112 such that the revised mesh network comprises a plurality of mesh lines. The mesh lines are at least substantially aligned with the first unit vectors and the second unit vectors. In a preferred embodiment, each mesh line is placed along a location of one of the first unit vectors or one of the second unit vectors. Also in a preferred embodiment, the mesh lines intersect in the same or in a substantially similar manner as the intersections of the first and second unit vectors in the grid. In a most preferred embodiment, the mesh lines of the revised mesh network have the same pattern as the grid generated in step 110.

Thus, in a preferred embodiment, each of the mesh lines of the revised mesh network is at least substantially aligned with a flow direction proximate a corresponding location along the surface of the vehicle body. That is, preferably half of the mesh lines are parallel to the estimated flow direction at particular points along the vehicle body surface (i.e., corresponding to the first unit vectors), while the other half of the mesh lines are intersecting mesh lines that are orthogonal to the estimated flow direction at particular points along the vehicle body surface (i.e., corresponding to the second unit vectors).

With reference again to FIGS. 4-6, preferably half of the mesh lines correspond with the first unit vectors 400 of FIG. 4, while the other half of the mesh lines correspond with the second unit vectors 500 of FIG. 6. The revised mesh network preferably represents the intersection of respective first and second unit vectors 400, 500 at various points along the vehicle body surface, for example as reflected in the grid 600 of FIG. 6.

In addition, and returning again to FIG. 1, in a preferred embodiment the revised mesh network further comprises a plurality of mesh points. Each mesh points represents an intersection of (i) a first mesh line that is parallel to the flow direction at a particular point along the vehicle body surface and (ii) a second mesh line that is orthogonal to the flow direction at that particular point along the vehicle body surface. The mesh points can then be used to obtain new and/or potentially more efficient and/or accurate predictions of air flow and/or measures pertaining thereto.

Specifically, the revised mesh network can be used to generate predictions of drag force (step 114) and lift force (step 116) for the vehicle body surface, among other possible values. In one preferred embodiment, such values of drag force and lift force can be predicted along each of the mesh points of the revised mesh network, using commonly known techniques applying the Navier-Stokes equations. The estimates corresponding to the different mesh points of the revised mesh network can then be aggregated together to generate a more efficient and accurate overall estimate of the drag and lift forces.

Because the mesh lines of the revised mesh network are aligned with the flow direction at various points along the vehicle body surface, the revised mesh network allows for potentially improved accuracy and/or stability of the predicted results using the revised mesh network. For example, the alignment of the mesh lines with the flow direction at various points along the vehicle body surface potentially reduces numerical inaccuracies in the estimated and predicted values. In addition, this similarly allows for accurate, reliable, and stable estimates to be generated with potentially much fewer mesh points as compared with traditional mesh networks. Accordingly, the revised mesh network generated in accordance with the process 100 of FIG. 1 potentially allows for more accurate and stable results with decreased processing time and costs and, consequently, potentially increased efficiency.

FIG. 2 is a functional block diagram of the above-referenced system 200 for generating a mesh network and estimating air flow around a vehicle body surface, in accordance with an exemplary embodiment of the present invention. As mentioned above, the system 200 can be used to implement the process 100 of FIG. 1. In addition, program products or software associated with the system 200 (for example that includes the program 212 depicted in FIG. 2 and described further below) can also be used to implement the process 100 of FIG. 1).

In the depicted embodiment, the system 200 includes sensors 202 and a computer system 204. The sensors 202 are configured to at least facilitate determining estimates for flow direction and velocity for the air flow at various locations around a surface of the vehicle body. This corresponds to step 104 of the process 100 of FIG. 1 in accordance with a preferred embodiment. Also in a preferred embodiment, a preliminary mesh network (preferably generated by the processor 206 described below) is also used in determining these estimates for flow direction and velocity. The sensors 202 preferably provide these estimates for flow direction and velocity to the processor 206 described below, either directly or indirectly via the interface 213 described below and/or one or more other interfaces, connections, and/or couplings. In a preferred embodiment, the sensors 202 are configured to be positioned proximate one or more locations along the vehicle body surface, for example as shown in FIG. 3.

The computer system 204 is coupled to the sensors 202. The computer system 204 generates the preliminary mesh network (corresponding to step 102 of the process 100 of FIG. 1), receives the estimates for flow direction and velocity from the sensors 202, implements these estimates in generating the revised mesh network (corresponding to steps 106-112 of the process 100 of FIG. 1), and generates predictions of drag force, lift force, and/or other values (corresponding to steps 112 and 114 of the process 100 of FIG. 1) in a preferred embodiment, among other potential functions of the computer system 204.

In the embodiment depicted in FIG. 2, the computer system 204 includes a processor 206 (as mentioned above), a memory 208, a computer bus 210, an interface 213 (also as mentioned above), and a storage device 214. The processor 206 performs the computation and control functions of the system 200, and may comprise any type of processor or multiple processors, single integrated circuits such as a microprocessor, or any suitable number of integrated circuit devices and/or circuit boards working in cooperation to accomplish the functions of a processing unit. During operation, the processor 206 executes one or more programs 212 preferably stored within the memory 208 and, as such, controls the general operation of the computer system 204.

The memory 208 stores a program or programs 212 that executes one or more embodiments of processes such as the process 100 depicted in FIG. 1 and described above in connection therewith, and/or various steps thereof and/or other processes. The memory 208 can be any type of suitable memory. This would include the various types of dynamic random access memory (DRAM) such as SDRAM, the various types of static RAM (SRAM), and the various types of non-volatile memory (PROM, EPROM, and flash). It should be understood that the memory 208 may be a single type of memory component, or it may be composed of many different types of memory components. In addition, the memory 208 and the processor 206 may be distributed across several different computers that collectively comprise the computer system 204. For example, a portion of the memory 208 may reside on a computer within a particular apparatus or process, and another portion may reside on a remote computer.

The computer bus 210 serves to transmit programs, data, status and other information or signals between the various components of the computer system 204. The computer bus 210 can be any suitable physical or logical means of connecting computer systems and components. This includes, but is not limited to, direct hard-wired connections, fiber optics, infrared and wireless bus technologies.

The interface 213 allows communication to the computer system 204, for example from a system operator and/or another computer system, and can be implemented using any suitable method and apparatus. It can include one or more network interfaces to communicate within the sensors 202, any other components of the system 200, one or more terminal interfaces to communicate with technicians, and one or more storage interfaces to connect to storage apparatuses such as the storage device 214.

The storage device 214 can be any suitable type of storage apparatus, including direct access storage devices such as hard disk drives, flash systems, floppy disk drives and optical disk drives. In one exemplary embodiment, the storage device 214 is a program product from which memory 208 can receive a program 212 that executes one or more embodiments of the process and/or steps thereof as described in greater detail further below. In one preferred embodiment, such a program product can be implemented as part of, inserted into, or otherwise coupled to the computer system 204 and/or one or more components thereof. As shown in FIG. 2, the storage device 214 can comprise a disk drive device that uses disks 215 to store data. As one exemplary implementation, the computer system 204 may also utilize an Internet website, for example for providing or maintaining data or performing operations thereon.

It will be appreciated that while this exemplary embodiment is described in the context of a fully functioning computer system, those skilled in the art will recognize that the mechanisms of the present invention are capable of being distributed as a program product in a variety of forms, and that the present invention applies equally regardless of the particular type of computer-readable signal bearing media used to carry out the distribution. Examples of signal bearing media include: recordable media such as floppy disks, hard drives, memory cards and optical disks (e.g., disk 215), and transmission media such as digital and analog communication links. It will similarly be appreciated that the computer system 204 may also otherwise differ from the embodiment depicted in FIG. 2, for example in that the computer system 204 may be coupled to or may otherwise utilize one or more remote computer systems and/or other control systems.

Accordingly, an improved method for estimating air flow around vehicle body surfaces and developing mesh networks for use in estimating air flow around vehicle body surfaces is provided. An improved program product is also provided that implements the steps of such an improved method. In addition, an improved system is provided for estimating air flow around vehicle body surfaces and developing mesh networks for use in estimating air flow around vehicle body surfaces. The provided method, program product, and system provide for potentially improved estimating and predicting of air flow around vehicle body surfaces and various values pertaining thereto, for such as drag forces and lift forces. For example, the method, program product, and system provide for improved estimating and predicting of such values, with potentially improved accuracy and/or stability of the estimations and predictions in a potentially less time-consuming, less expensive, and more efficient manner.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for developing a mesh network for analyzing air flow around a surface of a vehicle body, the method comprising the steps of:
    determining a plurality of estimates for a flow direction for the air flow for a plurality of locations around the surface using a sensor;
    generating a first plurality of unit vectors using the plurality of estimates, each of the first plurality of unit vectors representing a direction of flow for a respective one of the plurality of locations, and each of the first plurality of unit vectors being at least substantially parallel to the flow direction proximate the respective one of the plurality of locations;
    generating a second plurality of unit vectors using the plurality of estimates, each of the second plurality of unit vectors being at least substantially orthogonal to a corresponding one of the first plurality of unit vectors; and
    generating, via a processor, the mesh network using the first plurality of unit vectors and the second plurality of unit vectors, the mesh network comprising a plurality of mesh lines, each mesh line being at least substantially aligned with the flow direction proximate a corresponding one of the plurality of locations.

2. The method of claim 1, further comprising the step of:
    interposing the first plurality of unit vectors and the second plurality of unit vectors, to thereby generate a grid;
    wherein the step of generating the mesh network comprises the step of generating the mesh network based at least in part on the grid.

3. The method of claim 1, further comprising the step of:
    generating a preliminary mesh network;
    wherein the step of determining the plurality of estimates comprises for the flow direction comprises the step of determining the plurality of estimates for the flow direction for the plurality of locations around the surface using the sensor and the preliminary mesh network.

4. The method of claim 1, further comprising the step of:
    predicting a lift force for the air flow, based at least in part on the mesh network.

5. The method of claim 1, further comprising the step of:
    predicting a drag force for the air flow, based at least in part on the mesh network.

6. A program product for developing a mesh network for analyzing air flow around a surface of a vehicle body, the program product comprising:
    a program configured to at least facilitate:
        determining a plurality of estimates for a flow direction for the air flow for a plurality of locations around the surface;
        generating a first plurality of unit vectors using the plurality of estimates, each of the first plurality of unit vectors representing a direction of flow for a respective one of the plurality of locations, and each of the first plurality of unit vectors being at least substantially parallel to the flow direction proximate a respective one of the plurality of locations;
        generating a second plurality of unit vectors using the plurality of estimates, each of the second plurality of unit vectors being at least substantially orthogonal to a corresponding one of the first plurality of unit vectors; and
        generating the mesh network based at least in part on the first plurality of unit vectors and the second plurality of unit vectors, the mesh network comprising a plurality of mesh lines, each mesh line being at least substantially aligned with the flow direction proximate a corresponding one of the plurality of locations; and
    a non-transitory computer-readable signal bearing storage media storing the program.

7. The program product of claim 6, wherein the program is further configured to at least facilitate:
    interposing the first plurality of unit vectors and the second plurality of unit vectors, to thereby generate a grid; and
    generating the mesh network based at least in part on the grid.

8. The program product of claim 6, wherein the program is further configured to at least facilitate:
    generating a preliminary mesh network; and
    determining the plurality of estimates for the flow direction for the plurality of locations around the surface based at least in part on the preliminary mesh network.

9. The program product of claim 6, wherein the program is further configured to at least facilitate predicting a lift force for the air flow, based at least in part on the mesh network.

10. The program product of claim 6, wherein the program is further configured to at least facilitate predicting a drag force for the air flow, based at least in part on the mesh network.

11. A system for developing a mesh network for analyzing air flow around a surface of a vehicle body, the system comprising:
    a sensor configured to at least facilitate determining a plurality of estimates for a flow direction for the air flow for a plurality of locations around the surface; and
    a processor coupled to the sensor and configured to at least facilitate:
        generating a first plurality of unit vectors using the plurality of estimates, each of the first plurality of unit vectors representing a direction of flow for a respective one of the plurality of locations, and each of the first plurality of unit vectors being at least substantially parallel to the flow direction proximate a respective one of the plurality of locations;
        generating a second plurality of unit vectors using the plurality of estimates, each of the second plurality of unit vectors being at least substantially orthogonal to a corresponding one of the first plurality of unit vectors; and
        generating the mesh network based at least in part on the first plurality of unit vectors and the second plurality of unit vectors, the mesh network comprising a plurality of mesh lines, each mesh line being at least substantially aligned with the flow direction proximate a corresponding one of the plurality of locations.

12. The system of claim 11, wherein the processor is further configured to at least facilitate:

interposing the first plurality of unit vectors and the second plurality of unit vectors, to thereby generate a grid; and generating the mesh network based at least in part on the grid.

13. The system of claim 11, wherein the processor is further configured to at least facilitate:

generating a preliminary mesh network; and determining the plurality of estimates for the flow direction for the plurality of locations around the surface based at least in part on the preliminary mesh network.

14. The system of claim 11, wherein the processor is further configured to at least facilitate predicting a lift force, a drag force, or both, for the air flow, based at least in part on the mesh network.

* * * * *